(12) United States Patent
Parloo et al.

(10) Patent No.: US 10,093,073 B2
(45) Date of Patent: Oct. 9, 2018

(54) HONEYCOMB-BASED HIGH TEMPERATURE STRUCTURAL DAMPER

(71) Applicant: NITTO DENKO CORPORATION, Osaka (JP)

(72) Inventors: Eli Parloo, Genk (BE); Michael Ludwig, Duisburg (DE)

(73) Assignee: NITTO DENKO CORPORATION, Osaka (JP)

( * ) Notice: Subject to any disclaimer, the term of this patent is extended or adjusted under 35 U.S.C. 154(b) by 375 days.

(21) Appl. No.: 14/407,590

(22) PCT Filed: Jun. 13, 2013

(86) PCT No.: PCT/EP2013/001757
§ 371 (c)(1),
(2) Date: Dec. 12, 2014

(87) PCT Pub. No.: WO2013/185926
PCT Pub. Date: Dec. 19, 2013

(65) Prior Publication Data
US 2015/0147511 A1 May 28, 2015

(30) Foreign Application Priority Data

Jun. 13, 2012 (EP) .................................... 12004460

(51) Int. Cl.
*B32B 3/12* (2006.01)
*B32B 11/08* (2006.01)
(Continued)

(52) U.S. Cl.
CPC ............ *B32B 3/12* (2013.01); *A47L 15/4209* (2016.11); *B32B 11/08* (2013.01); *B32B 15/06* (2013.01);
(Continued)

(58) Field of Classification Search
None
See application file for complete search history.

(56) References Cited

U.S. PATENT DOCUMENTS 3,160,549 A * 12/1964 Caldwell ................. B32B 27/00
428/319.1
3,399,104 A 8/1968 Ball et al.
(Continued)

FOREIGN PATENT DOCUMENTS

CN 1816378 A 8/2006
CN 101761751 A 6/2010
(Continued)

OTHER PUBLICATIONS

Second Office Action issued by the State Intellectual Property Office of China dated Jan. 20, 2017, in connection with Chinese Patent Application No. 201380042505.8.
(Continued)

*Primary Examiner* — Daniel J. Schleis
(74) *Attorney, Agent, or Firm* — Edwards Neils LLC; Jean C. Edwards, Esq.

(57) ABSTRACT

A honeycomb based high temperature structural damper laminate, based on a core structure including a honeycomb laminated with a layer of a structural damping material. A method for producing the laminate, as well as the use of the laminate in various fields of application.

13 Claims, 4 Drawing Sheets

(51) Int. Cl.
  *B32B 15/06* (2006.01)
  *F16F 15/02* (2006.01)
  *A47L 15/42* (2006.01)

(52) U.S. Cl.
  CPC ........ *F16F 15/02* (2013.01); *B32B 2307/102* (2013.01); *B32B 2307/304* (2013.01); *B32B 2307/56* (2013.01); *B32B 2605/08* (2013.01); *B32B 2605/18* (2013.01); *Y10T 428/1476* (2015.01); *Y10T 428/24149* (2015.01); *Y10T 428/24157* (2015.01)

(56) References Cited

U.S. PATENT DOCUMENTS

| | | | |
|---|---|---|---|
| 4,461,796 A | | 7/1984 | Fukahori et al. |
| 5,473,122 A | * | 12/1995 | Kodiyalam .......... F16F 1/3605 181/294 |
| 5,858,521 A | * | 1/1999 | Okuda .................. B32B 25/04 428/340 |
| 6,179,086 B1 | | 1/2001 | Bansemir et al. |
| 6,966,402 B2 | | 11/2005 | Matias et al. |
| 7,419,031 B2 | | 9/2008 | Liguore et al. |
| 7,695,796 B2 | | 4/2010 | Ichikawa et al. |
| 2004/0154418 A1 | | 8/2004 | Pompei |
| 2006/0000186 A1 | | 1/2006 | Carlson et al. |
| 2007/0101679 A1 | | 5/2007 | Harthcock et al. |
| 2008/0176027 A1 | * | 7/2008 | Pflug .................. B29D 99/0089 428/116 |
| 2012/0177877 A1 | * | 7/2012 | Lebail .................. E04C 2/365 428/116 |

FOREIGN PATENT DOCUMENTS

| | | |
|---|---|---|
| CN | 102009501 A | 4/2011 |
| DE | 102004011775 A1 | 9/2005 |
| EP | 0 038 091 A1 | 10/1981 |
| EP | 1995052 A1 | 11/2008 |
| FR | 2 838 173 A1 | 10/2003 |
| JP | S62-094329 A | 4/1987 |
| WO | 2005/044630 A1 | 5/2005 |
| WO | 2008/141688 A2 | 11/2008 |
| WO | 2010/149353 A1 | 12/2010 |
| WO | 2010/149354 A1 | 12/2010 |

OTHER PUBLICATIONS

Notification of Reasons for Refusal issued by the Japanese Patent Office dated Aug. 30, 2016, in connection with Japanese Patent Application No. 2015-516513.
International Search Report issued in PCT/EP2013/001757 dated Aug. 19, 2013.
Woo-Young Jung et al; "A combined honeycomb and solid viscoelastic material for structural damping applications"; Mechanics of Materials; Aug. 1, 2003; pp. 831-844; vol. 35, No. 8; Elsevier.
First Office Action issued by the State Intellectual Property Office (SIPO) of China dated Jun. 2, 2016, in connection with corresponding Chinese Patent Application No. 201380042505.8.
Rejection Decision issued by the State Intellectual Property Office of China dated May 11, 2017, in connection with Chinese Patent Application No. 201380042505.8.

* cited by examiner

HONEYCOMB-BASED HIGH TEMPERATURE STRUCTURAL DAMPER

CROSS-REFERENCE TO RELATED APPLICATIONS

The present invention is a 35 U.S.C. 371 National Stage Entry of PCT/EP2013/001757, filed Jun. 13, 2013, which claims priority from European Patent Application No. 12004460.7, filed on Jun. 13, 2012, the contents of both of which are herein incorporated by reference in their entirety.

THE PRESENT INVENTION

The present invention is concerned with a honeycomb based high temperature structural damper laminate (in the following also laminate), based on a core structure comprising a honeycomb laminated with a layer of a structural damping material. The present invention also provides a method for producing said laminate as well as the use of said laminate in various fields of application.

THE PRIOR ART

WO 2010/149353 and WO 2010/149354 disclose insulation materials which are, in particular, characterized in that an elastomeric foam is present in the cells of a honeycomb structure with two facing panels directly adherent to the honeycomb structure. These documents very generally refer to the option of adding damping layers, but no specific configuration or material choice is disclosed.

U.S. Pat. No. 6,179,086 B1 relates to a noise attenuating sandwich composite panel comprising an inner honeycomb core layer sandwiched between two different cover skins consisting of open-mesh fiber material. U.S. Pat. No. 4,461, 796 A discloses a composite structural body comprising a honeycomb core for the use as a sound damping material. However, these documents do not disclose a structural damping material layer on the honeycomb structures.

In U.S. Pat. No. 7,419,031 B2, FR 2 838 173 A1 and U.S. Pat. No. 3,399,104 A, vibration damping materials comprising honeycomb core layers are disclosed. EP 0 038 091 A1 relates to an integral laminated sandwich structure suitable for the manufacture of skis.

US 2004/154418 A1 relates to a honeycomb panel, wherein selected honeycomb cells are either empty or entirely filled with a polymer having a very low modulus. However, a structure comprising a continuous damping layer is not disclosed.

DE 102004011775 discloses a structure comprising as core materials a thermoplastic foam material being present in the cells of a thermoplastic honeycomb. US 2007/0101679, U.S. Pat. No. 6,966,402, and US 2006/000186 disclose multicomponent panels comprising a honeycomb filled with various materials which may be activated during the process of manufacture (such as by heat) so that various types of damping materials are obtained. These two prior art documents disclose accordingly structures where the honeycomb is filled with a (thermally) activated foam.

WO 2005/044630 discloses a sound insulating system comprising two sound absorbing layers with an interposed barrier layer. The barrier layer generally is described as being a typically thin sheet (see page 5 of WO 2005/044630) although there are embodiments wherein a honeycomb core may also be used as a barrier layer. The adjacent sound absorbing layers are made from skinned foam materials wherein the skinned portion of the foam is positioned adjacent the openings in the honeycomb such that the skin of the foam closes the open ends of the honeycomb to provide the overall (sound) barrier function.

These prior art materials focus on a combination of lightweight construction materials also providing thermal insulation. However there remains a need in the art for materials able to provide structural damping (vibration) in combination with good thermal and sound insulating properties. It would be advantageous if such beneficial combinations of properties would be achievable with materials over a wide temperature range, with structures being of small size (thickness), which preferable should be easy to construct. Thereby a wide range of applications would be made possible with one type of structural damping material. One type of a very demanding application for a structural damping material is a dishwasher. There good thermal insulation properties are required in order to avoid a great loss of energy required to heat the water employed. Further also sound insulating properties are demanded (water droplets sprayed around inside the dishwasher), in order to provide "silent" dishwashers. Finally also vibrations (which would contribute to undesired noise) should be reduced as much as possible, while of course the damping material should be as lightweight as possible, so that an undesired vast increase of overall weight in avoided. At the same time the space available for any damping structure to be provided around the dishwasher tub (but inside the outer housing) is limited so that a damping material is required which is lightweight, of small thickness with the possibility to provide the desired insulating properties over a wide temperature range (covering for example the temperature range of the various dishwashing programs of a dishwasher, which may cover a range of from coldwater programs to washing programs with water temperatures of up to 65° C. or 70° C. (in industrial dishwashing systems even higher).

OBJECT OF THE PRESENT INVENTION

Accordingly, the present invention aims at providing structural damping materials solving one or more of the problems described above. In particular a combination of good thermal and sound insulating properties in a structure with a small thickness is one of the most important objects of the present invention.

BRIEF DESCRIPTION OF THE PRESENT INVENTION

The present invention solves this object with the subject matter as defined herein. Accordingly the present invention first provides a structural damping laminate according to the following concept A while in a second embodiment the present invention provides the structural damping laminate in the following concept B. The preferred embodiments as described below apply, as far as not otherwise indicated to both concepts A and B. Preferred embodiments of the present invention are described in the following detailed description.

DETAILED DESCRIPTION OF THE PRESENT INVENTION

Figures 2A, 2B:
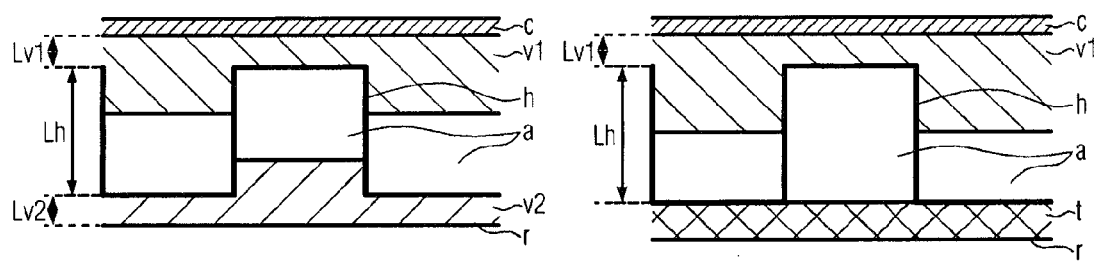
FIGS. 2a and 2b show further details of the structures identified in FIGS. 1a and 1b.

The claimed honeycomb based high temperature structural damper laminates in accordance with the present invention according to concept A and concept B are based on a core structure comprising a honeycomb laminated with a layer of a structural damping material. According to concept A of the present invention the at least one layer of the structural damping material is provided in such a manner that the structural damping material at least partially fills (impregnates) cells of the honeycomb core while still providing a continuous layer of the structural damping material on top of at least one side of the honeycomb core. As can be seen in FIGS. 2a and 2b and in FIGS. 4a and 4b the layer of the structural damping material proves a part being present as continuous layer on the top of the honeycomb core layer (Lv1 and Lv2) while at the same time, a part of the structural damping material is present inside cells of the honeycomb (Lh/5, Lh, Lh/3). In concept B of the present invention the layer of the structural damping material is provided only in a manner that no material fills cells of the honeycomb core layer ("clean lamination"). In both embodiments, i.e. concept A and concept B the structural damping material may be freely selected among materials known to the average skilled person, preferable among those materials exemplified further below.

As described above, in one embodiment (concept A), the laminate in accordance with the present invention comprises a honeycomb core layer and at least one adjacent layer of a structural damping material, wherein the structural damping material at least partially fills cells of the honeycomb core layer. In this embodiment of the present invention it is of course also possible to have two layers of structural damping material (where the material may be selected independently) on both sides of the honeycomb core layer, wherein again at least one of the layers of the structural damping material at least partially fills cells of the honeycomb core layer. It is of course also possible that both layers of the structural damping material at least partially fill cells of the honeycomb core layer. The degree of filling of the cells of the honeycomb core layer may be selected in accordance with the desired application, taking in particular also into account the desired thickness of the overall laminate. Possible cell fill percentages, which are also referred to herein as cell fill ratios, are from 100% (a cell of the honeycomb core layer is completely filled with the structural damping material) to only a small cell fill percentage, such as 5% or more. Typical cell fill percentages envisaged by the present invention are in the range of from 100% to 10%, with suitable and, in embodiments, preferred cell fill ratios being from 100% to 25%, such as 25 to 75%, in embodiments about 50%.

Figure 3A:
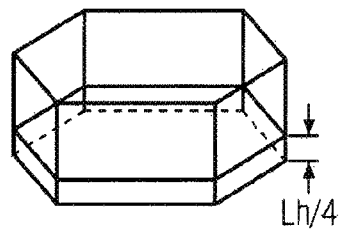
FIGS. 3a, 3b and 3c show examples of single cells of the honeycomb core envisaged by the present invention with different cell fill ratios.
Figure 3B:
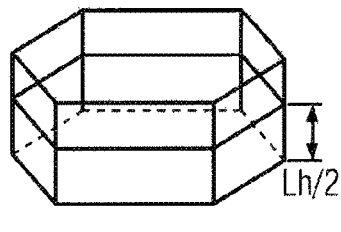
Figure 3C:
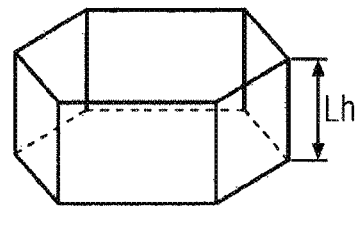

FIG. 3 exemplifies three different cell fill ratios, namely 25%, 50% and 100%. In FIGS. 3a to 3c, Lh designates the depth of a cell of a honeycomb core and at the same time a 100% cell fill ratio, and in FIGS. 3a and 3b, Lh/4 and Lh/2 respectively designate cell fill ratios of 25% and 50%. As outlined above and as furthermore clearly shown in FIGS. 4a and 4b, the damping material provides a continuous layer on top of the honeycomb core.

Figure 4A:
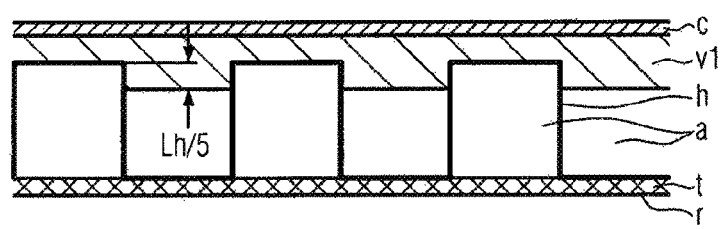
FIGS. 4a and 4b show further details of the structural damping materials of the present invention as illustrated in FIGS. 1a and 1b.
Figure 4B:
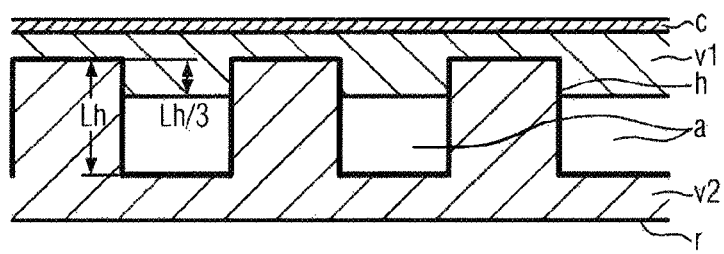

In FIG. 4a the cells of the honeycomb core open to the topside are filled to 20% with the damping material, while in FIG. 4b an embodiment is shown where the damping material provided on top of the honeycomb core fills the cells open to the topside to 33%, while the cells open to the bottom side of the honeycomb core are filled at a ratio of 100% with the second damping material provided on the bottom side of the honeycomb core.

In FIGS. 4a and 4b, c designates a constraint layer, while the designations v1 and v2 designate a first and second layer of damping material, respectively. h designates the honeycomb core while a defines air entrapped within the honeycomb core. r designates a release liner, while t defines an adhesive tape, typically a double-sided adhesive tape. In the embodiment shown in FIG. 4b, a tape with adhesive properties is not required since the damping material is selected so that it provides the desired adhesive properties.

Figure 1A:
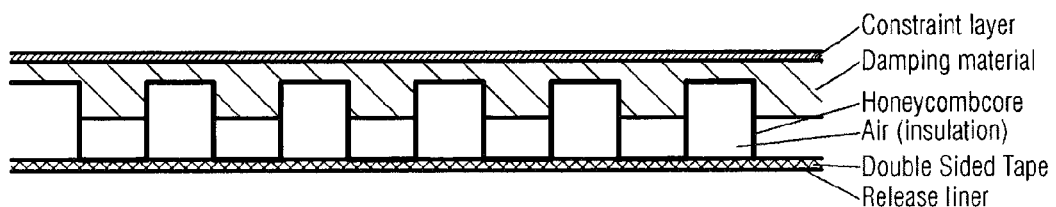
FIGS. 1a and 1b show two options for concept A of the present invention.
Figure 1B:
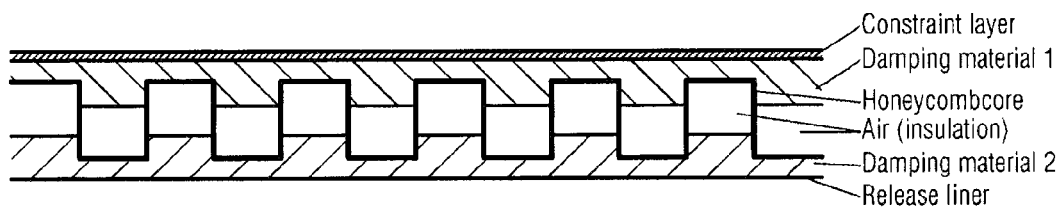

Similar embodiments are also depicted in FIGS. 1a and 1b, where again in FIG. 1a an embodiment is shown with only one layer of damping material provided on the topside of the honeycomb core. In FIG. 1b, an embodiment is shown wherein two layers of damping material are provided which in this case both fill cells of the honeycomb core only partially. FIG. 2, finally, shows more detailed views of the embodiments as depicted in FIGS. 1a and 1b. In FIG. 2, the letters as shown have the same meaning as described above for FIGS. 4a and 4b.

As outlined above, the cell fill ratios may be selected upon the desired end application and, when two layers of structural damping material are provided which both fill at least partially cells of the honeycomb structure, the cell fill ratios for the two layers of the structural damping material may be selected independently, as is the case for the choice of the material. It is of course also possible to have two layers of structural damping material wherein only one of these layers at least partially fills the cells of the honeycomb core layer.

Those cells which are completely or partially filled with the structural damping material, preferably viscoelastic material, are preferably filled at least to about one third of the volume of the cell, with a filling ratio of 100% for some cells being also envisaged by the present invention (in particular for very thin laminates). Preferred however are lower cell filled ratios so that in the partially filled cells, a remaining material-free space (air-filled etc.) remains (improving typically thermal insulation).

In a preferred embodiment for concept A in accordance with the present invention the material within the cells of the honeycomb structure is not foamed. In this context the structural damping material may be in particular a layer made of a rubber or a thermoplastic elastomer, such as butyl rubber or a styrene based thermoplastic elastomer. One possible embodiment according to concept A may be a damping material comprising a constraint layer, preferably an aluminium constraint layer, connected with a butyl rubber (damping) layer, combined with a honeycomb layer, such as a polypropylene honeycomb layer. Preferably such an embodiment then comprises a suitable adhesive layer on the other side of the honeycomb structure to ensure proper adhesion to the desired adherent. Prior to use such an adhesive layer, which preferably may be a double coated adhesive tape, is protected with a release liner, which is removed prior to adhesion to the adherent. With such a configuration in accordance with concept A high performance vibration damping as well as treatment of low frequency noise and vibration problems can be ensured. In addition excellent damping performance even at higher temperature conditions are ensured, while also providing additional rigidity to the adherent as well as good thermal insulation properties.

In a second embodiment in accordance with the present invention, as described above (concept B), the structural damping material does not fill the cells of the honeycomb core layer. Also in this embodiment, it is possible to provide two layers of structural damping material on both sides of the honeycomb core layer, and again the type of material (as well as layer thickness etc.) may be selected independently in view of desired end use etc.

Typical layer thicknesses for the layer of the structural damping material (for concept A as well as concept B) are however in the range as exemplified below for the honeycomb core, and typical thicknesses are in the range of from 0.5 to 100 mm, preferably 2 to 100 mm, more preferably 2 to 50 mm, further preferably 3 to 25 mm, and in particular about 3 to 10 mm (determined in accordance with ISO1923). In case of concept A the thickness is the total thickness of the material provided on top of the honeycomb core as well as the material filling cells of the honeycomb core (see FIGS. 1 and 4, the thickness of the layer of the structural damping material is the sum of Lh/5 or Lh or Lh/3 of FIGS. 4 $a$ to $c$ with Lv1 or Lv2 of FIGS. 2 $a$ and 2$b$).

The material for the honeycomb structure is not essential (i.e. maybe selected among various materials) and at least in a preferred embodiment in the honeycomb structure one half of the cells are closed in an alternating manner on each side of the honeycomb structure (i.e. open cells on one end correspond to closed cells on the other end). When such a honeycomb core layer is employed half of the cells may be at least partially filled (i.e. to the desired cell fill ratio) with a structural damping material when a layer of the structural damping material is provided only on one side of the honeycomb core layer. If however a layer of the structural damping material is provided on both sides of the honeycomb core layer all of the cells are at least partially filled with a structural damping material. In this case half of the cells (i.e. those open on one side) are filled with one structural damping material to the selected cell fill ratio, while the other half of the cells is filled with a second (same of different) structural damping material to the respectively selected cell fill ratio (which again may be the same or different from the cell fill ratio on the first side).

As outlined above, a preferred honeycomb core layer is a honeycomb structure wherein the individual cells are closed on one side of the honeycomb core layer in an alternating fashion, so that on each side open cells and closed cells alternate. Accordingly, only 50% of the cells are open on one side, while the other 50% of the cells are closed on that side. On the other side of the respective honeycomb core layer, the cells which are open on the one side are closed on the other side. A particular preferred embodiment of such a honeycomb core layer is described in WO 2008/141688 (EP 1995052).

The material of the honeycomb core layer is not critical and the honeycomb can be made out of various types of materials, such as thermoplastic materials, in particular PP, PA, PVC, PE, PET etc., as well as paper-based materials, such as cardboard, or metals, such as steel or aluminum.

The overall thickness of the honeycomb core layer may be selected depending on the desired end use and typical thicknesses are in the range of from 2 to 100 mm, preferably 2 to 50 mm, more preferably 3 to 25 mm, and in particular about 3 to 10 mm (determined in accordance with ISO1923).

The shape and configuration of the individual cells of the honeycomb core layer may again be selected depending on the desired end use, and examples include hexagonal cross sections with straight (perpendicular) walls (with respect to the surface of the honeycomb core layer), while also embodiments with convex or concave walls of the individual cells are possible.

With respect to the structural damping material, again, any suitable material known to the average skilled person may be employed. A structural damping material in accordance with the present invention is a material providing in particular vibration damping in a laminate (see for example the broad definition as provided for the resin based materials disclosed in EP2065456 and EP1926778), and typical examples are various viscoelastic materials, such as polymer-based materials (such as butyl rubber as well as acrylic based adhesives) and naturally occurring viscoelastic materials (bitumen based materials, such as asphalt). Suitable in accordance with the present invention however are also foam materials, adhesives, such as acrylic based adhesives (which again may be foam materials) etc. as long as they contribute to the overall properties of the claimed damping structure/laminate. In particular preferred are butyl rubber, thermoplastic elastomers (TPE), such as styrene based or polyolefine based TPEs, bitumen based materials, and in some embodiments also adhesives, such as adhesive foam materials based on acrylic resins.

In particular, for the structural damping material provided on the side of the laminate in accordance with the present invention which is a later attached to the article where damping is required, it is a further preferred embodiment of the present invention when the structural damping material for this side of the honeycomb has self-adhesive properties. This means that on top of the layer of the structural damping material only a release layer needs to be provided, which can then be removed prior to adhering the laminate in accordance with the present invention to a desired article of manufacture. Due to the fact that the structural damping material provided on this side of the laminate has self-adhesive properties, it is possible to adhere the laminate to the desired article of manufacture without using a further adhesive layer, such as the double-sided adhesive tapes mentioned herein.

Suitable examples of such self-adhesive structural damping materials are known to the average skilled person and include in particular butyl rubber, which can be employed as self-adhesive structural damping material. When using such a self-adhesive structural damping material, no further adhesive layers, as mentioned above, are necessary. In such a case, the layer of the self-adhesive structural damping material may be first provided, for example by means of extrusion, between two release liners to make a three-layered structure of release liner/self-adhesive structural damping material/release liner. The first release liner is then removed in order to attach the self-adhesive structural damping material to the honeycomb core. The second release liner remains on the layer of the self-adhesive structural damping material and is only removed once the overall laminate in accordance with the present invention is to be attached to a desired article of manufacture.

If a non-self-adhesive structural damping material is employed, it is of course necessary to provide other means for adhesion. As mentioned herein, it is possible to employ either double-sided adhesive tapes in order to provide the necessary means for adhering a laminate in accordance with the present invention to a desired article of manufacture. However, it is also possible to simply employ a single layer of adhesive or glue, covered by a release liner in order to provide adhesiveness for the overall laminate so that a single adhesive/glue layer is provided on the side of the laminate later to be adhered to the desired article, protected by a release liner which of course is removed prior to adhering the laminate to the article.

A further way of selecting the structural damping material to be employed in accordance with the present invention is the option to select the structural damping material on the basis of its density. Again, depending on the type of desired end-use, the choice of density offers the opportunity to tailor properties of the laminate in accordance with the present invention. If the structural damping material selected on the basis of the density a suitable density range for such structural damping material is from 500 to 5000 kg/m$^3$.

Preferably, the structural damping material is a material with a density in the range of from 800 to 4000 kg/m$^3$, more preferably from 1000 to 3500 kg/m$^3$, and most preferably from about 1400 to 3000 kg/m$^3$. The choice of the structural damping material on the basis of the density of the material enables a further tail ring of the overall properties of the laminates in accordance with the present invention. In particular, if sound isolation is only of lesser concern, the density of the structural damping material may be low so that overall resulting in a lightweight laminate. On the other hand, by using a high-density structural damping material good sound isolating properties can be ensured, and by using in this case rather high cell fill ratios an overall thin laminate with good balance of properties may be obtained. As indicated above, polymer-based materials, in particular rubber materials, such as butyl rubber, and bitumen-based materials are preferred as structural damping materials.

The use of viscoelastic materials is in particular preferred (in particular for concept A), since these materials can be easily brought into contact with the honeycomb core layer, and in particular in concept A it is simple to achieve the required at least partial filling of the cells, since same can be ensured by providing pressure on top of the layer of the structural damping material, since this will force the structural damping material into the open cells of the honeycomb core.

The laminates in accordance with concepts A and B of the present invention may comprise, in addition to the honeycomb core and the at least one layer of the structural damping material as essential layers, further at least one constraint layer typically provided on top of the at least one layer of the structural damping material. Such a constraint layer may again be selected from constraint layers known to the skilled person, which may be provided in the form of films/foils, this sheets, webs/textile materials (woven or non-woven), as well as fibers. Suitable examples are metal based layers, such as Al-foils (thickness typically 10 to 1000 micrometer, preferably 50 to 500 micrometer), steel layers; silica based materials (glass cloths, glass fibers); textile materials for example based on naturally occurring fibers (hemp, cotton etc.) as well as sheets and films made of thermoplastic materials, such as polyolefins (PP, PE), polyesters (PET), polyamides etc.

These constraint layers may be embossed, perforated or structured in any other desired way.

The thickness of the constraint layer may be selected depending on the desired end use and the chosen material and typical thicknesses are in the range of from 0.01 to 5 mm, preferably 0.05 to 4 mm, more preferably 0.1 to 2 mm, and in particular about 0.1 to 0.5 mm (determined according to EN1939).

The type of material for the constraint layer is not critical, however preferred constraint layers for both embodiments of the present invention are metal based foils, glass fibre based layers (such as glass cloth) and sheets as well as films and sheets based on thermoplastic materials. In particular preferred is an Al-foil as well as glass cloth.

Typically, the constraint layer is provided on the side of the honeycomb core which is facing away from the adhesive layer, i.e. the side where the laminate in accordance with the present invention is later attached to desired article of manufacture. In FIGS. 1a and 1b, the constraint layer is shown as being present on top of the first layer of structural damping material on the side of the honeycomb core being opposite to the side where the release liner, and the double-sided adhesive tape or the self-adhesive structural damping material is provided. This arrangement provides the best damping results, compared to other possible layer sequences.

Further layers are provided depending on the need, such as constraint layers mentioned above, adhesive layers, in particular, double-sided adhesive tapes (preferably with a release liner) or, in the case of self-adhesive structural damping material, a release liner only.

In a preferred embodiment, the laminate of the present invention contains a single constraint layer, which provides a favourable balance of damping/reinforcement properties and low weight.

Adhesive layers may be provided on the one hand between the layer of the structural damping material and a constraint layer, in order to improve adhesion between these two layers. It is also possible to provide a thin coating of adhesive on the honeycomb core so that adhesion between honeycomb core layer and the layer of the structural damping material layer is improved. However, the most preferred adhesive layer provided in a laminate of the present invention is an adhesive layer provided on the side of the laminate of the present invention which is to be attached in the desired end use application to the article which will comprise a laminate in accordance of the present invention, such as a dishwasher. Such an adhesive layer typically comprises before the attachment to the end use article a release liner of any type, so that the adhesive layer is protected. The adhesive layer itself may be a single layer of adhesive (provided with a release liner on one side) or a double side adhesive tape again with a release liner on one side. Such an adhesive layer however may also be absent, in particular when the layer of the structural damping material comprises a material with self adhesive properties. In such a case the layer of the structural damping material may provided the required adhesion to secure attachment to the end use article. In such a case however the layer of the structural damping material is typically required to be provided with a release liner prior to the attachment to the end use article. In these embodiments, i.e. when the adhesion to the end use article is provided by means of a layer of structural damping material, it is preferred when the laminate of the present invention comprises two layers of structural damping material, i.e. a layer on each side of the honeycomb core.

Suitable examples of laminates in accordance with the present invention (concept A as well as concept B) comprise the following order of layers:

Constraint layer/layer of structural damping material/honeycomb core layer/adhesive layer/release liner Constraint layer/layer of structural damping material/honeycomb core layer/layer of structural damping material/adhesive layer/release liner Constraint layer/layer of structural damping material/honeycomb core layer/layer of self adhesive structural damping material/release liner Constraint layer/layer of structural damping material/honeycomb core layer/double side adhesive tape/release liner Other layer configurations may be employed, desired on the end use application.

Overall the laminate in accordance with the present invention provides a unique combination of thermal and sound insulation, with good vibration damping properties over a broad temperature range. At the same time the laminate of the present invention is thin (in particular in concept A due to the provision of the layer of the structural damping material partially inside the honeycomb core), of light weight (due to the use of the honeycomb core layer), while providing sufficient stiffness/structural reinforcement (honeycomb core layer and constraint layer). In particular in concept A the partial filling of cells of the honeycomb core enables a reduction of the laminate thickness, while other properties, such as sound and thermal insulation are not sacrificed. By suitable combining materials of choice with cell fill ratios a balance can be found between thickness of the laminate and damping/insulating properties. This is one of the achievements of the present invention, which distinguishes the claimed technical teaching from the prior art disclosure.

In general, the laminates in accordance with the present invention may be prepared using conventional production techniques and equipment. Suitably a honeycomb core layer may be provided first which is then coated, sequentially or simultaneously, with the other layers of a desired laminate structure of the present invention.

The laminates in accordance with the present invention may be generally used in any desired field of application where damping is required. A typical field of application is in the white good field, including washing machines and dishwashers, however, the laminates in accordance with the present invention may also be employed in other fields, such as automotive, aerospace construction, architecture (including interior design). Due to the option to provide thermal insulation as well as noise reduction (by insulation as well as by means of vibration damping) by means of a thin laminate the laminates of the present invention may be employed in a broad range of end use applications. Due to the use of the preferred layer structure and material choice it is possible to provide the desired damping effect also in high temperature environments and/or in fields which undergo vast temperature changes (such as from room temperature to 80° C.).

For example, a preferred embodiment in accordance with the present invention (concept A or B) is a laminate comprising the following order of layers:

Constraint layer/layer of structural damping material/honeycomb core layer/double side adhesive tape/release liner A damping material having this configuration is particularly favourable for the treatment of low frequency noise and vibration problems and exhibits excellent damping performance for higher temperature conditions, increases the rigidity of the substrate and provides favourable thermal insulation.

In a preferred alternative embodiment (in accordance with concept A or B), the laminate comprises the following orders of layers:

Constraint layer/interlayer/honeycomb core layer/layer of structural damping material/double side adhesive tape/release liner Constraint layer/interlayer/honeycomb core layer/layer of self-adhesive structural damping material/release liner Herein, the interlayer may be a further layer consisting of structural damping material, which may have self-adhesive properties; an adhesive layer in accordance with the above description; or a interlayer consisting of a material that is fusible with the constraint and honeycomb core layers under pressure and/or heat, such as a thermoplastic resin film comprising ethylene vinyl acetate (EVA) copolymer, vinyl chloride resin, vinyl acetate resin or EVA-vinyl chloride resin copolymer. In a particularly preferred embodiment, the constraint layer is made of glass cloth, glass fiber or aluminum; the interlayer is a thermoplastic resin film comprising ethylene-vinyl acetate (EVA), a thermoplastic elastomer, or an adhesive; and the damping layer is a self-adhesive thermoplastic elastomer, the adhesion properties of which may be heat-activatable.

By using either adhesive layers or layers made of self-adhesive or activatable thermoplastic elastomer layers the overall number of layers can be suitably reduced while still maintaining the desired functionality. Providing such a layer between a constraint layer and the honeycomb core ensures suitable anchorage of the constraint layer on the honeycomb core while also providing additional damping properties, in particular when using thermoplastic elastomer layer. On the other side of the honeycomb core a layer of a self-adhesive or activatable thermoplastic elastomer layer ensures a good anchorage of the honeycomb core and thereby of the entire structure to the desired adherent, once the protective release liner has been removed prior to adhesion of the desired adherent.

In conjunction with the advantages mentioned above, this particular embodiment exhibits favourable vibration damping properties, excellent bending strength and/or buckling strength and thus provides advantageous reinforcement properties. In addition, the laminate may be applied on painted surfaces and withstands paint hardening temperatures, which renders the laminate particularly suitable for automotive and transportation applications.

In general, using a self-adhesive thermoplastic elastomer (which may be heat-activatable) as a damping layer also allows to avoid the use of heat-sensitive siliconised liners.

The embodiments described above provide structural damping materials which are able to provide a multitude of functionalities, such as reduction of vibration, reduction of low frequency noise, high damping performance at high temperatures, increasing rigidity of the adherent, good thermal insulation properties as well as easy applicability. Structure in accordance with the present invention in particular can provide damping properties as well as higher rigidity to thin metal sheets and panels, thereby for example preventing easy deformation/bending of such thin substrates. Such increase rigidity for example may be used to protect automotive parts from easy deformation by mechanical forces. In addition, as outlined above, good noise reduction and vibration reduction can be ensured.

The following examples illustrate the present invention.

EXAMPLE 1

Figure 5:
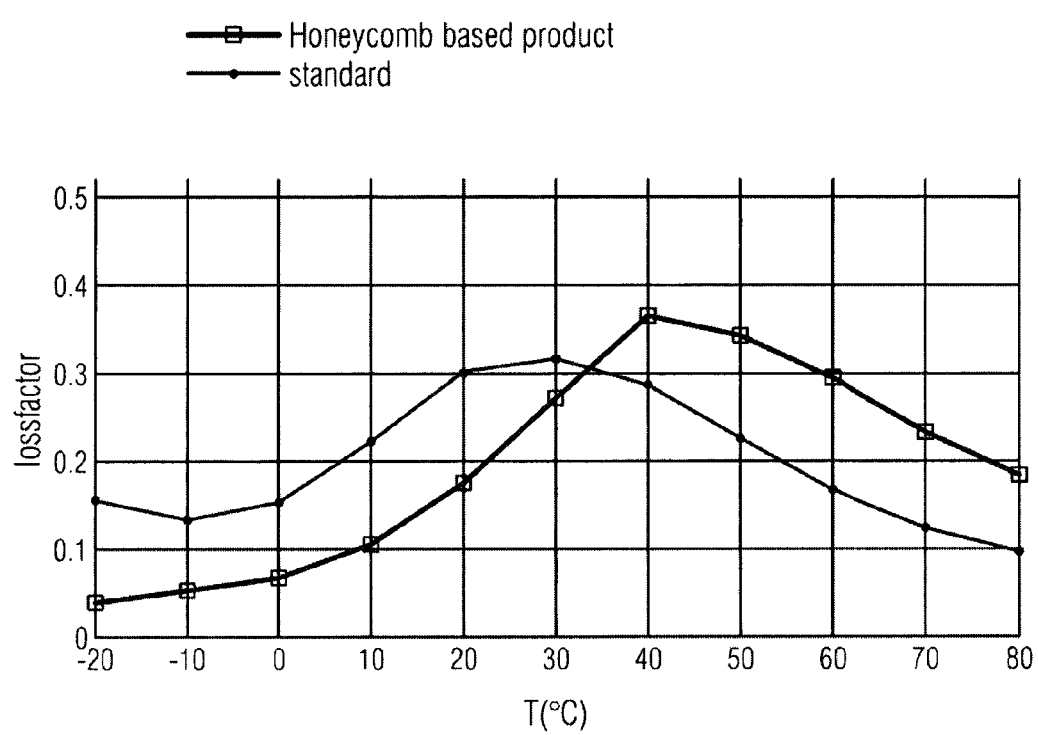
FIG. 5 shows the Oberst test results of the comparative example and the example in accordance with the present invention.

As comparative example a conventional Legetolex damping laminate (total thickness 4 mm, 127 micrometer Al-foil constraint layer, density 7 kg/m² ) was used. A laminate in accordance with the present invention was produced using a 127 micrometer Al-foil constraint layer with a honeycomb core layer (50% of cells closed on each side) with a thickness of about 3 mm and a layer of structural damping material between the constraint layer and the honeycomb core layer with a cell fill ratio of 100%. Overall thickness of the laminate in accordance with the present invention was 3.8 mm with an overall density of 3.85 kg/m². Damping properties where evaluated according to ISO6721-2 (Oberst test) and a test specimen was applied to a 10 mm wide and 1 mm thick steel bar with a free length of 200 mm and the loss factor for the second mode of the bar was measured. The conventional product showed satisfactory properties up to standard temperatures (up to about 30° C.). The laminate in accordance with the present invention however shows clearly superior properties in the temperature range of from 40 to 80° C. Taking into account that a similar thickness is given, but a much reduced density for the laminate in accordance with the present invention, it is clear that the present invention provides a superior damping material (see FIG. 5).

EXAMPLE 2

A laminate in accordance with the present invention was produced using a honeycomb core layer with a thickness of about 3.5 mm and a layer of structural damping material between the constraint layer and the honeycomb core layer with a cell fill ratio of 0%, with the resulting laminate structure being: constraint layer/interlayer/honeycomb core layer/damping material/release liner. The overall thickness of the laminate in accordance with the present invention was 5.4 mm (without release liner) with a total weight of 3.6 kg/m².

Figure 6:
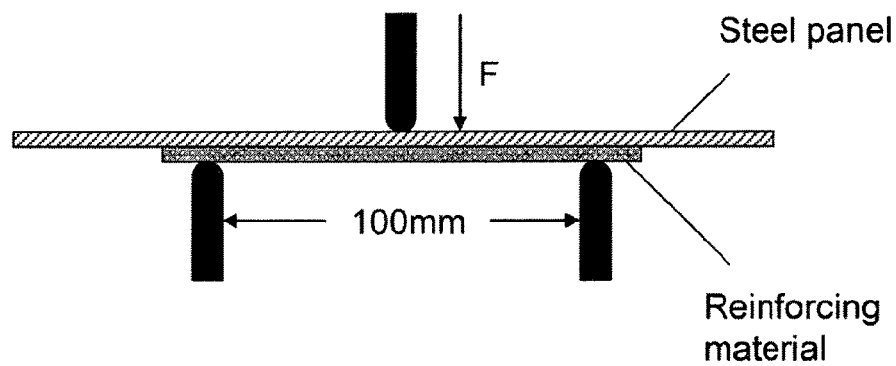
FIGS. 6 and 7 show a test specimen and measurement results, respectively.
Figure 7:
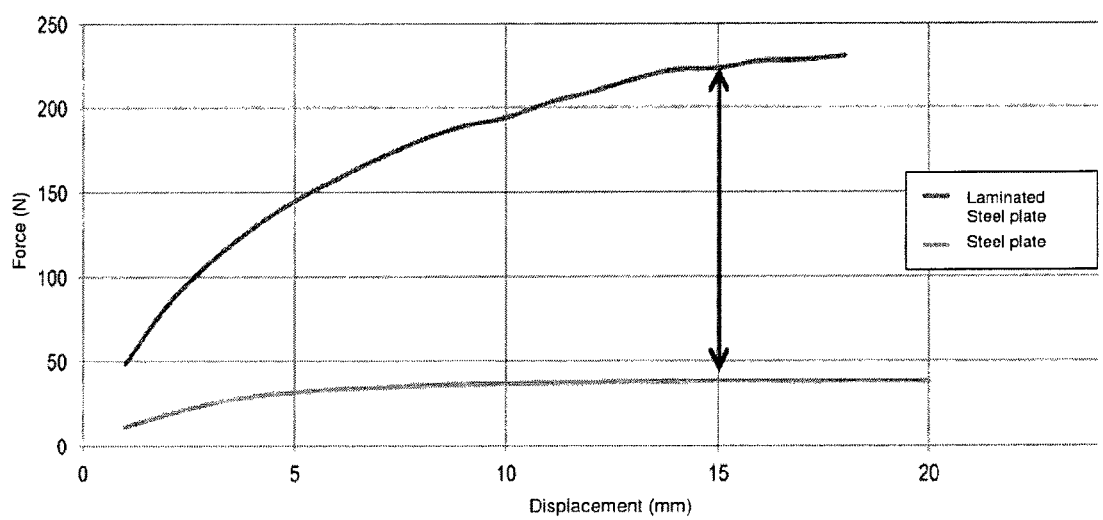

The reinforcement properties were evaluated by measuring the flexural strength in relation to the displacement using a 3-point bend testing mode. The test specimens were constructed using a sandwich configuration, with a steel panel (dimensions 0.8 mm×25 mm×150 mm) as a top substrate, the bottom surface of which has been laminated with the laminate in accordance with the present invention having the dimensions 5.4 mm×25 mm×140 mm With the steel panel up, a testing bar was moved down on a lengthwise center portion of the test piece from above in a vertical direction and was pressed down against the laminated steel plate until the test piece was bent or displaced by 20 mm from its original position (see FIG. 6). The force required to bend of laminated plate was measured as flexural strength (N), which was evaluated as the reinforcing effect. As a comparative example, the flexural strength of a non-laminated steel panel was measured. The measurement results shown in FIG. 7 demonstrate that laminating the steel panel with the material of the present invention results in excellent reinforcement properties. For instance, with the laminate used in this example, a reinforcement factor of 5.5 is obtained at 15 mm displacement.

Thereafter, a laminate sample prepared as outlined above was cut into pieces of 25 mm width and then the release liner was peeled off therefrom. Then, the respective pieces of the reinforcing laminate sheet were press-contacted with the painted surface of a painted steel plate by rollers of 2. 5 kg. After 30 minutes passed, a 90° peel test (tensile speed: 100 mm/min; in accordance with ISO 8510) was carried out to measure the adhesion (N/25 mm), and the measured values were evaluated as the adhesiveness to the painted steel plate. All samples measured accordingly exhibited a favourable adhesiveness to the painted steel surface of at least 25 N/25 mm.

The invention claimed is:

1. A laminate, comprising a honeycomb core layer and at least one layer of a structural damping material,
    wherein the honeycomb core layer is configured so that on each side, open cells and closed cells alternate, with the cells being open on one side and closed on the other side,
    wherein the structural damping material provides a continuous layer on top of at least one side of the honeycomb core layer, and
    wherein the structural damping material extends from the continuous layer to the open cells on the at least one side of the honeycomb core layer, and the structural dampening material does not extend to the closed cells on the at least one side of the honeycomb core layer, so as to form an alternating pattern of at least partially filled cells and unfilled cells on the at least one side of the honeycomb core layer.

2. The laminate according to claim 1 further comprising a constraint layer.

3. The laminate according to claim 1, wherein on each side of the honeycomb core 50% of the cells are closed.

4. The laminate according to claim 1, wherein the structural damping material is butyl rubber or asphalt.

5. The laminate according to claim 1, comprising on each side of the honeycomb core layer a layer of a structural damping material.

6. The laminate according to claim 2, wherein the constraint layer is selected among metal based foils and sheets, and films and sheets prepared of thermoplastic materials.

7. The laminate according to claim 1, wherein the laminate further comprises a double side adhesive sheet provided on one side thereof with a release liner.

8. The laminate according to claim 1, wherein the cell fill ratio is from 20% to 100%.

9. A dishwasher comprising the laminate of claim 1.

10. The laminate according to claim 1, wherein the laminate is used for at least one of thermal insulation, sound insulation, or vibration damping.

11. The laminate according to claim 10, wherein the laminate is used in at least one of White Good Industry, automotive, or aerospace sector.

12. A method of producing the laminate in accordance with claim 1, comprising the steps of:
    providing a honeycomb core layer;
    providing at least one layer of a structural damping material; and
    providing a constraint layer.

13. The method according to claim 12, wherein the layers are provided sequentially or simultaneously by lamination or (co)-extrusion processes.

* * * * *